(12) United States Patent
Wang et al.

(10) Patent No.: US 12,155,815 B2
(45) Date of Patent: Nov. 26, 2024

(54) CAMERA CALIBRATION METHOD AND CALIBRATION DEVICE

(71) Applicant: SUZHOU CHINA STAR OPTOELECTRONICS TECHNOLOGY CO., LTD., Jiangsu (CN)

(72) Inventors: Baoyou Wang, Jiangsu (CN); Feng Gao, Jiangsu (CN); Wenbing Zhang, Jiangsu (CN)

(73) Assignee: SUZHOU CHINA STAR OPTOELECTRONICS TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/758,069

(22) PCT Filed: Apr. 20, 2022

(86) PCT No.: PCT/CN2022/087895
§ 371 (c)(1),
(2) Date: Jun. 27, 2022

(87) PCT Pub. No.: WO2023/197347
PCT Pub. Date: Oct. 19, 2023

(65) Prior Publication Data
US 2024/0179296 A1 May 30, 2024

(30) Foreign Application Priority Data
Apr. 11, 2022 (CN) .......................... 202210376237.4

(51) Int. Cl.
H04N 17/00 (2006.01)
H04N 25/47 (2023.01)
H04N 25/703 (2023.01)

(52) U.S. Cl.
CPC ........... *H04N 17/002* (2013.01); *H04N 25/47* (2023.01); *H04N 25/703* (2023.01)

(58) Field of Classification Search
CPC .... H04N 17/002; H04N 25/47; H04N 25/703; G06T 7/80
See application file for complete search history.

(56) References Cited

U.S. PATENT DOCUMENTS

| 2003/0044176 A1 | 3/2003 | Saitoh | |
| 2020/0260029 A1* | 8/2020 | Kang | H04N 25/705 |
| 2024/0069307 A1* | 2/2024 | Gregoire | G02B 7/38 |

FOREIGN PATENT DOCUMENTS

| CN | 105721859 A | 6/2016 |
| CN | 110365969 A | 10/2019 |

(Continued)

OTHER PUBLICATIONS

International Search Report in International application No. PCT/CN2022/087895, mailed on Nov. 30, 2022.

(Continued)

*Primary Examiner* — Michael E Teitelbaum
(74) *Attorney, Agent, or Firm* — PV IP PC; Wei Te Chung

(57) ABSTRACT

A camera calibration method and a calibration device are provided. A predicted Z-axis coordinate is predicted by obtaining a functional relationship between a distance of a plurality of pixel regions and a Z-axis coordinate and a distance of a plurality of real-time pixel regions of an initial picture which is obtained at an initial position by the camera to be calibrated. One of a lens and a photosensitive chip is controlled to move relative the other of the lens and the photosensitive chip from the initial position to the predicted Z-axis coordinate.

16 Claims, 4 Drawing Sheets

(56) References Cited

FOREIGN PATENT DOCUMENTS

| CN | 113037948 A | 6/2021 |
|----|-------------|--------|
| CN | 113406764 A | 9/2021 |
| CN | 114222108 A | 3/2022 |

OTHER PUBLICATIONS

Written Opinion of the International Search Authority in International application No. PCT/CN2022/087895, mailed on Nov. 30, 2022.

* cited by examiner

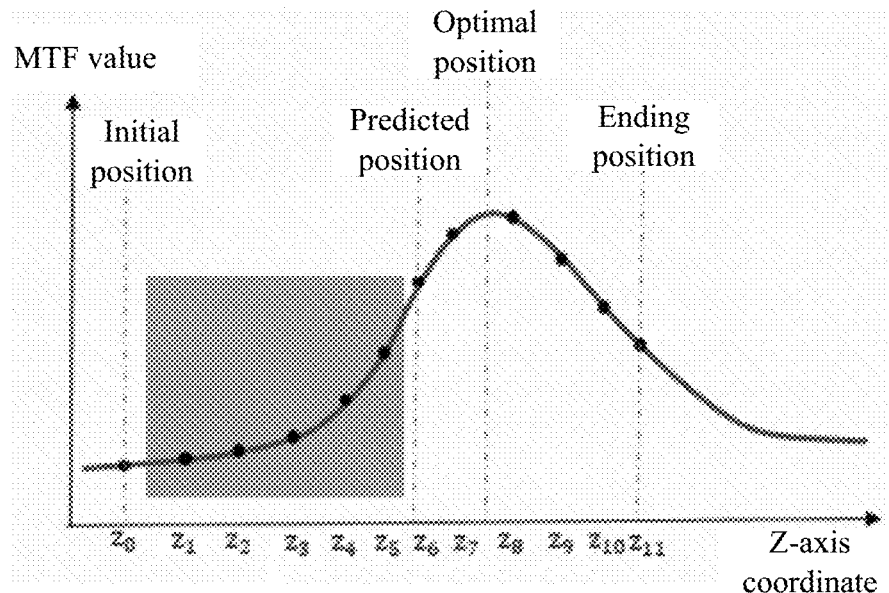

Distances of a plurality of sample pixel regions of a plurality of preferred pictures, which are obtained at a preferred imaging position range by a sample camera, and a plurality of sample Z-axis coordinates are obtained — S10

The functional relationship between the distance of the plurality of pixel regions and the Z-axis coordinate is generated according to the distances of the plurality of sample pixel regions and the plurality of sample Z-axis coordinates — S11

FIG. 6

CAMERA CALIBRATION METHOD AND CALIBRATION DEVICE

TECHNICAL FIELD

The present disclosure relates to the camera technology field, and more particularly to a camera calibration method and a camera calibration device.

BACKGROUND ART

As consumers have higher and higher requirements for definition of a picture, cameras for mobile phones, vehicles, monitoring, and televisions have higher and higher requirements for pixels currently. In one aspect, perfect accuracy cannot be achieved because an error between an optical axis center of a lens and an optical axis center of a photosensitive chip exists due to a module manufacturing process. In another aspect, theoretical imaging effect cannot be achieved due to an assembly error after the lens and the chip. Active alignment (AA, active focus) technology is generated correspondingly.

However, in the current AA technology, a complementary metal oxide semiconductor (COMS) imaging chip is clamped through a three-axis or six-axis adjustment device and lit, and then a Z-axis position of the chip or the lens is adjusted by gradually upward or downward movement to achieve the best imaging effect. Accordingly, a circle time (CT) for producing a camera product is longer.

Technical Problem

Embodiments of the present disclosure provide a camera calibration method and a calibration device capable of solving the problem that a CT for producing a camera product is longer.

Technical Solution

An embodiment of the present disclosure provides a camera calibration method for calibrating a camera. The camera includes a lens and a photosensitive chip. The camera calibration method includes:
obtaining a functional relationship between a distance of a plurality of pixel regions and a Z-axis coordinate, wherein each of the pixel regions comprises a plurality of pixels, and the Z-axis coordinate is a Z-axis coordinate of the lens relative to the photosensitive chip;
obtaining a distance of a plurality of real-time pixel regions of an initial picture which is obtained at an initial position by the camera to be calibrated;
generating a predicted Z-axis coordinate according to the distance of the plurality of real-time pixel regions and the functional relationship; and
controlling one of the lens and the photosensitive chip to move relative to the other of the lens and the photosensitive chip from the initial position to the predicted Z-axis coordinate.

In some embodiments, the step of obtaining the functional relationship between the distance of the plurality of pixel regions and the Z-axis coordinate includes:
obtaining distances of a plurality of sample pixel regions of a plurality of preferred pictures, which are obtained at a preferred imaging position range by a sample camera, and a plurality of sample Z-axis coordinates, wherein the sample camera and the camera to be calibrated have the same model, and definition of each of the preferred pictures corresponding to the preferred imaging position is higher than definition of a picture captured by the sample camera at at least one other position; and
generating the functional relationship between the distance of the plurality of pixel regions and the Z-axis coordinate according to the distances of the plurality of sample pixel regions and the plurality of sample Z-axis coordinates.

In some embodiments, the step of obtaining the distances of the plurality of sample pixel regions of the plurality of preferred pictures, which are obtained at the preferred imaging position range by the sample camera, and the plurality of sample Z-axis coordinates includes:
controlling the sample camera to move to a preferred imaging position and a plurality of peripheral positions adjacent to the preferred imaging position, wherein the preferred imaging position range comprises the preferred imaging position and the plurality of peripheral positions; and
obtaining the distances of the plurality of sample pixel regions of the plurality of preferred pictures, which are obtained at the preferred imaging position and the plurality of peripheral positions by the sample camera, and the plurality of sample Z-axis coordinates.

In some embodiments, the step of controlling the sample camera to move to the preferred imaging position and the plurality of peripheral positions adjacent to the preferred imaging position includes:
controlling the sample camera to move to the preferred imaging position; and
controlling the sample camera to move, from the preferred imaging position served as a starting point and along a positive direction and a negative direction of the Z-axis, to the plurality of peripheral positions adjacent to the preferred imaging position.

In some embodiments, after the step of controlling the one of the lens and the photosensitive chip to move relative to the other of the lens and the photosensitive chip from the initial position to the predicted Z-axis coordinate, the camera calibration method further comprises:
controlling the one of the lens and the photosensitive chip to move, through at least one movement operation, relative to the other of the lens and the photosensitive chip to a final Z-axis coordinate.

In some embodiments, definition of the picture obtained at the final Z-axis coordinate by the camera is higher than definition of the picture obtained at the predicted Z-axis by the camera.

In some embodiments, a Z-axis movement distance corresponding to each of the at least one movement operation is smaller than a Z-axis movement distance from the initial position to the predicted Z-axis coordinate.

In some embodiments, a number of the plurality of real-time pixel regions of the initial picture is not less than 5, and a number of the sample pixel regions of each of the preferred pictures is not less than 5.

In some embodiments, the functional relationship is a linear functional relationship.

An embodiment of the present disclosure further provides a camera calibration device for calibrating a camera. The camera calibration device includes: a first clamping module used for clamping a lens; a second clamping module used for clamping a photosensitive chip; a memory used for storing a plurality of program instructions; and a processor electrically connected to the memory, the photosensitive chip, and one of the first clamping module and the second clamping module, wherein the processor is used for executing the plurality of program instructions to implement the above-mentioned camera calibration method.

Advantageous Effects

Compared with the prior art, in the camera calibration method and the calibration device, the predicted Z-axis coordinate of the lens and the photosensitive chip of the camera to be calibrated is predicted by the functional relationship between the distance of the plurality of pixel regions and the Z-axis coordinate, and the one of the lens and the photosensitive chip is controlled to move relative to the other of the lens and the photosensitive chip from the initial position to the predicted Z-axis coordinate. This can skip step-by-step adjustments of multiple intermediate positions from the initial position to the predicted Z-axis coordinate. Accordingly, the problem that a CT for producing a camera product is longer can be solved.

BRIEF DESCRIPTION OF DRAWINGS

FIG. 5 illustrates a schematic diagram of changes of MTF values relative to a Z-axis coordinate when a picture is captured by a camera in FIG. 4.

FIG. 6 illustrates a flowchart of step S1 in FIG. 4.

DETAILED DESCRIPTION OF EMBODIMENTS

To make the objectives, technical schemes, and technical effects of the present disclosure more clearly and definitely, the present disclosure will be described in detail below by using embodiments in conjunction with the appending drawings. It should be understood that the specific embodiments described herein are merely for explaining the present disclosure but are not intended to limit the present disclosure.

Figure 1:
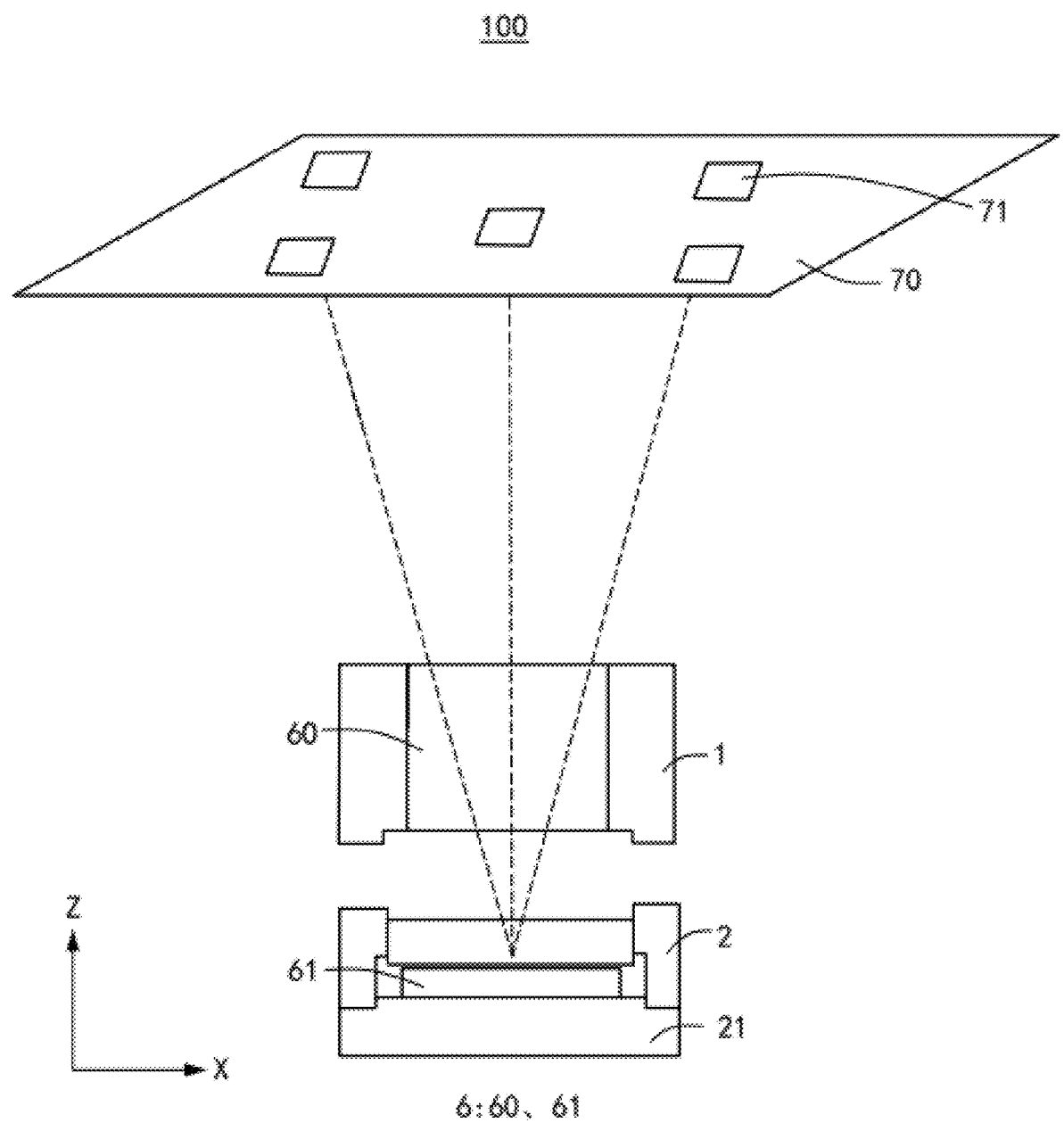
FIG. 1 illustrates a working schematic diagram of a camera calibration device provided by an embodiment of the present disclosure.
Figure 2:
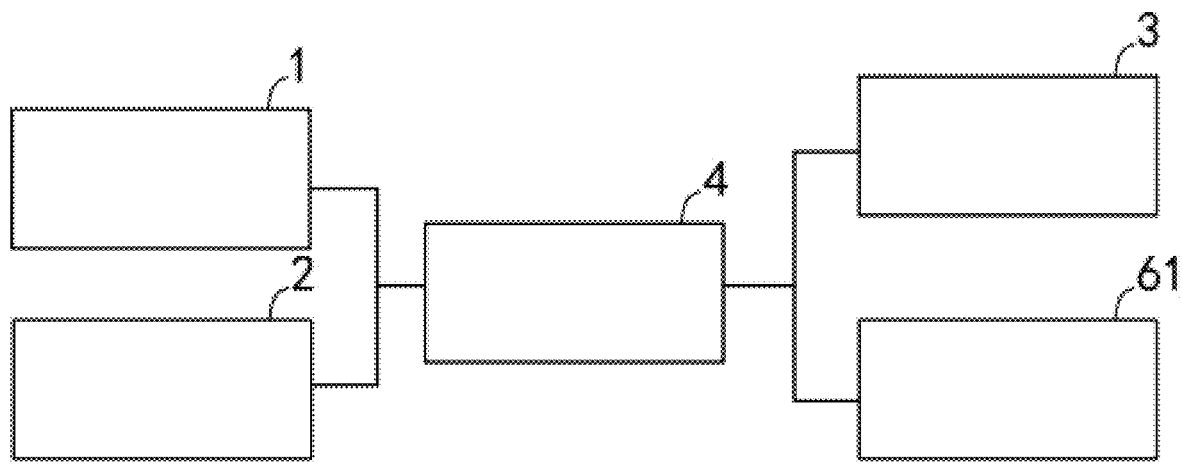
FIG. 2 illustrates a schematic block diagram of the camera calibration device in FIG. 1.

As shown in FIG. 1 and FIG. 2, an embodiment of the present disclosure provides a camera calibration device 100, which includes a first clamping module 1, a second clamping module 2, a processor 3, and a memory 4. A camera 6 includes a lens 60 and a photosensitive chip 61. The camera calibration device 100 is used for calibrating a relative position of the lens 60 and the photosensitive chip 61 in a Z-axis direction (a Z direction in FIG. 1). Exemplarily, the Z-axis direction is an optical axis direction of the camera 6, and the optical axis direction is perpendicular to an image plane of the camera 6.

The first clamping module 1 can be a three-axis or six-axis clamp for clamping the lens 60.

The second clamping module 2 can be a three-axis or six-axis clamp for clamping the photosensitive chip 61. The second clamping module 2 is used for clamping a circuit board 21 (printed circuit board, PCB), and the circuit board 21 is used for being electrically connected to the photosensitive chip 61 and used for lighting the photosensitive chip 61.

The memory 4 is electrically connected to the processor 3 for storing a plurality of program instructions. Exemplarily, the memory 4 can be disposed on the circuit board 21. The memory 4 can be a non-permanent memory, a random access memory (RAM), and/or a non-volatile memory in a computer-readable medium, such as, a read-only memory (ROM) or a flash memory (flash RAM).

The processor 3 is electrically connected to the first clamping module 1 and/or the second clamping module 2 to control movement of the first clamping module 1 and/or movement of the second clamping module 2. The processor 3 is further electrically connected to the photosensitive chip 61 to process a picture 70 captured by the photosensitive chip 61 through the lens 60. Exemplarily, the processor 3 can be disposed on the circuit board 21. The processor 3 can be a micro controller unit (MCU), an integrated chip, a control circuit or the like. The processor 3 is used for executing the plurality of program instructions to implement a camera calibration method.

Figure 4:
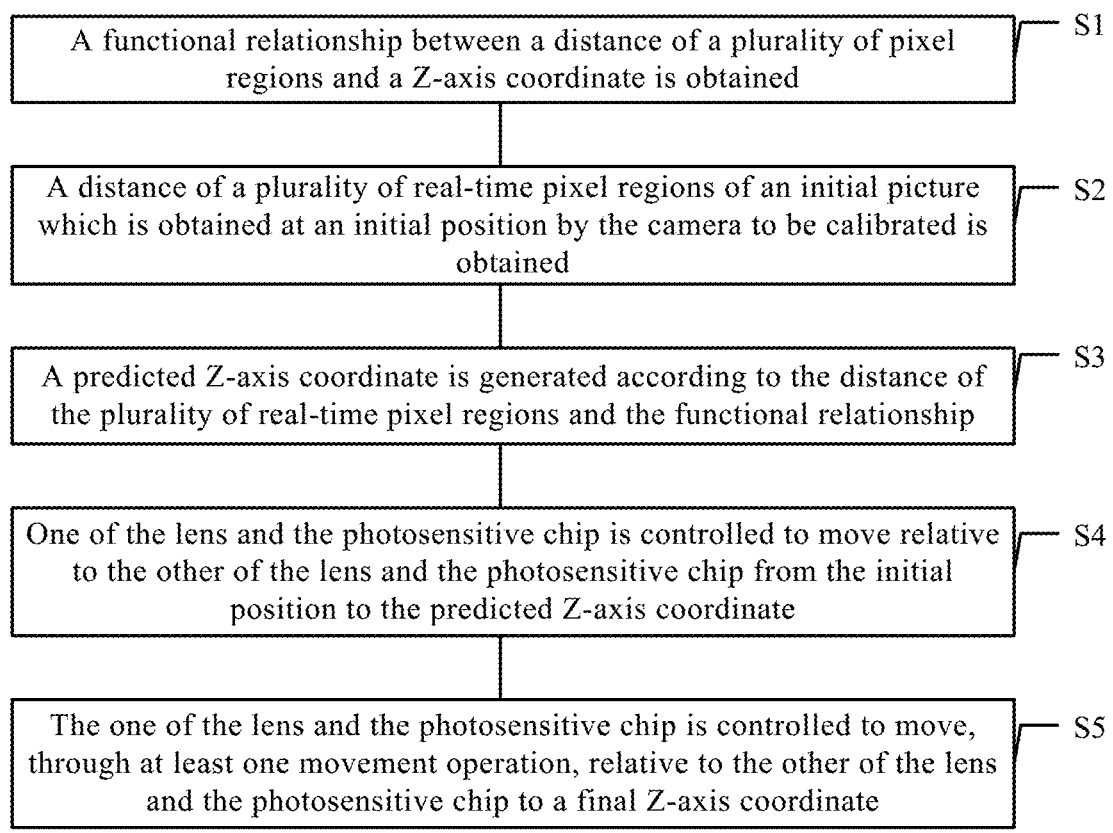
FIG. 4 illustrates a flowchart of a camera calibration method provided by an embodiment of the present disclosure.

Please refer to FIG. 4. The camera calibration method includes the following steps.

In step S1, a functional relationship between a distance of a plurality of pixel regions and a Z-axis coordinate is obtained.

Figure 3A:
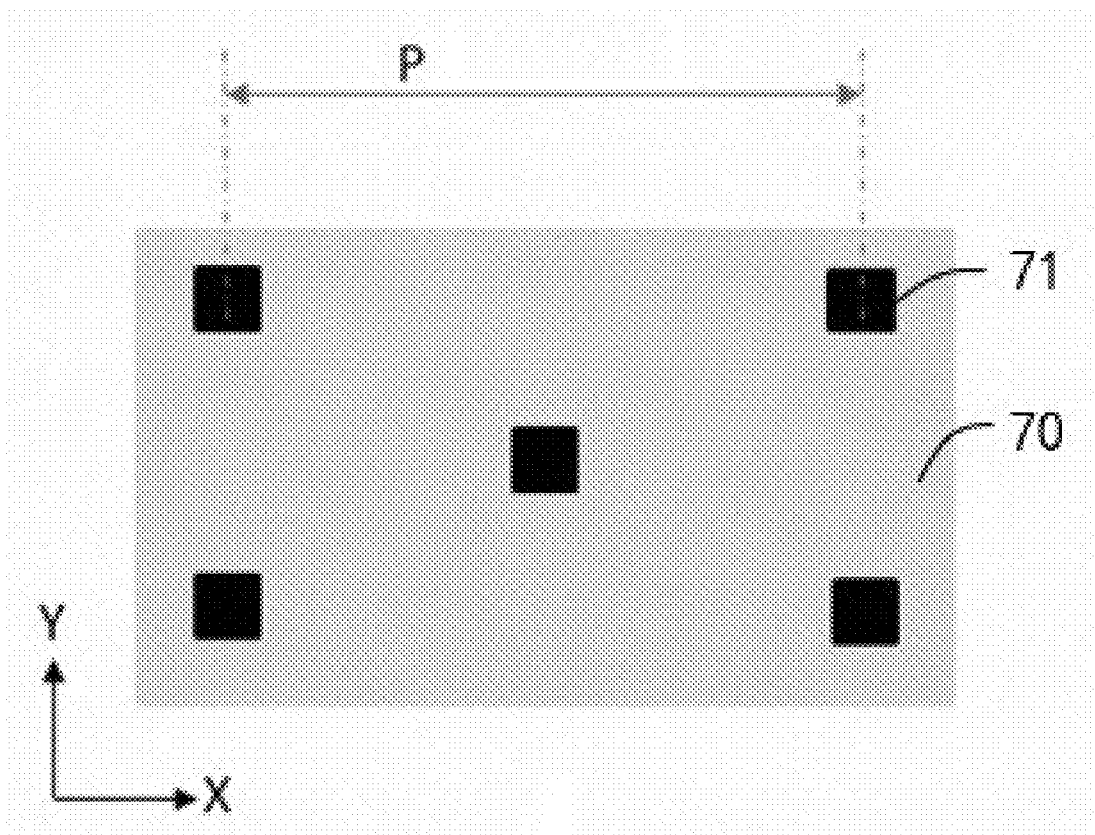
FIG. 3A illustrates a schematic diagram of a picture captured by a camera in FIG. 1.
Figure 3B:
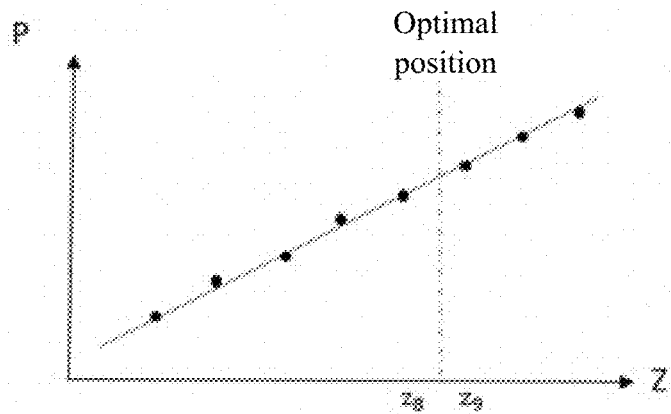
FIG. 3B illustrates a functional relationship diagram between a relative Z-axis coordinate of a lens and the photosensitive chip of the camera in FIG. 1 and a distance of a plurality of pixel regions.

As shown in FIG. 3A, the inventors found through experiments that distances P of a plurality of pixel regions 71 (i.e., blocks each including a plurality of sub-pixels) at an optimal position (i.e., a position having optimal definition) for capturing the picture 70 by camera products with the same model P tend to be constant. Exemplarily, a distance of 5 or more pixel regions at a position having optimal definition for capturing a picture by a first camera tends to be equal to a distance of 5 or more pixel regions at a position having optimal definition for capturing a picture by a second camera with the same model. As shown in FIG. 3B, the inventors further found that there is a stable functional relationship between the distance P of the plurality of pixel regions 71 and a Z-axis coordinate. The Z-axis coordinate is a Z-axis coordinate of the lens 60 relative to the photosensitive chip 61. Accordingly, the inventors use this rule to propose the inventive idea that, for the same batch of camera products, calibration time of other products can be saved during a manufacturing process by automatically learning a position having optimal definition at one time. Accordingly, the functional relationship between the distance P of the plurality of pixel regions and the Z-axis coordinate for products with the same model can be stored in an instruction library of the memory 4 for the processor 3 to obtain.

Specifically, a numerical index for measuring definition of the picture 70 can adopt, at a selected frequency, a spatial frequency response (SFR) function or an optical transfer function (modulation transfer function, MTF).

In step S2, a distance of a plurality of real-time pixel regions of an initial picture which is obtained at an initial position by the camera to be calibrated is obtained.

Please refer to FIG. 5. FIG. 5 illustrates a schematic diagram of changes of MTF values relative to the Z-axis coordinate when a picture is captured by a camera. By controlling the camera 6 to capture a picture at the initial position (i.e., the initial position Z0), the processor 3 can obtain the initial picture at the initial position captured by the camera 6. By analyzing data of the initial picture, the processor 3 can obtain the distance of the plurality of real-time pixel regions at a position having optimal definition.

In step S3, a predicted Z-axis coordinate is generated according to the distance of the plurality of real-time pixel regions and the functional relationship.

Please refer to FIG. 5. By substituting the distance of the plurality of real-time pixel regions into the functional relationship, the processor 3 can obtain a corresponding Z-axis coordinate and use the obtained Z-axis coordinate as the predicted Z-axis coordinate (i.e., a predicted position Z6).

In step S4, one of the lens 60 and the photosensitive chip 61 is controlled to move relative to the other of the lens 60 and the photosensitive chip 61 from the initial position to the predicted Z-axis coordinate.

Please refer to FIG. 5, the processor 3 sends the Z-axis coordinate to the first clamping module 1 and/or the second clamping module 2 and controls the first clamping module 1 and/or the second clamping module 2 to move, so that the one of the lens 60 and the photosensitive chip 61 clamped by the first clamping module 1 or the second clamping module 2 moves relative to the other of the lens 60 and the photosensitive chip 61 from the initial position to the predicted Z-axis coordinate. As such, the one of the lens 60 and the photosensitive chip 61 directly moves relative to the other of the lens 60 and the photosensitive chip 61 from the initial position Z0 to the predicted position Z6. This can skip step-by-step adjustments of multiple intermediate positions from the initial position Z0 to the predicted position Z6 in the prior art, such as Z1-Z5 (a shaded portion in FIG. 5), thereby shortening adjustment time of the lens 60 and the photosensitive chip 61.

In step S5, the one of the lens 60 and the photosensitive chip 61 is controlled to move, through at least one movement operation, relative to the other of the lens 60 and the photosensitive chip 61 to a final Z-axis coordinate.

Please refer to FIG. 5. Since the predicted Z-axis coordinate is not necessarily a Z-axis coordinate corresponding to an optimal imaging position, the processor 3 can further control the first clamping module 1 and/or the second clamping module 2 to perform the at least one movement operation after the camera 6 is controlled to reach the predicted Z-axis coordinate, so that the one of the lens 60 and the photosensitive chip 61 moves relative to the other of the lens 60 and the photosensitive chip 61 to the Z-axis coordinate corresponding to the optimal imaging position (i.e., an ending position Z11). Exemplarily, the final Z-axis coordinate can be the Z-axis coordinate corresponding to the optimal imaging position (i.e., an optimal position Z8). Definition of the picture obtained at the final Z-axis coordinate by the camera 6 is higher than definition of the picture obtained at the predicted Z-axis by the camera 6.

In step S4, by applying the calibration rule found by the inventors to control the camera 6 to directly move from the initial position to the predicted Z-axis coordinate, the calibrated camera 6 is already close to the final Z-axis coordinate corresponding to the optimal imaging position. Accordingly, it is only necessary to fine-tune the Z-axis coordinate of the lens 60 of the calibrated camera 6 relative to the photosensitive chip 61, and then the final Z-axis coordinate can be quickly reached. Accordingly, a Z-axis movement distance corresponding to each of the at least one movement operation (i.e., at least one fine-tuning operation) is smaller than a Z-axis movement distance from the initial position to the predicted Z-axis coordinate.

Please refer to FIG. 6. Further, step S1 includes the following steps.

In step S10, distances of a plurality of sample pixel regions of a plurality of preferred pictures, which are obtained at a preferred imaging position range by a sample camera, and a plurality of sample Z-axis coordinates are obtained. The sample camera and the camera 6 to be calibrated have the same model.

The preferred imaging position range includes a preferred imaging position and a plurality of peripheral positions. The processor 3 controls the first clamping module 1 and/or the second clamping module 2 to perform multiple movements, controls a movement parameter of a next movement by analyzing definition of a picture captured at a movement position reached by the last movement, and finally controls one of a lens and a photosensitive chip of the sample camera to move relative to the other of the lens and the photosensitive chip to move to the preferred imaging position. Definition of each of the preferred pictures corresponding to the preferred imaging position is higher than definition of a picture captured by the sample camera at at least one other position. For example, the preferred imaging position can be an optimal imaging position.

Further, the processor 3 controls the first clamping module 1 and/or the second clamping module 2 to move from the preferred imaging position served as a starting point to move to control the one of the lens and the photosensitive chip of the sample camera to perform, along a positive direction and a negative direction of the Z-axis, multiple movements with a specific distance (e.g., 10 micrometers) relative to the other of the lens and the photosensitive chip, so as to move to the plurality of peripheral positions adjacent to the preferred imaging position. Exemplarily, a number of the plurality of peripheral positions can be ten.

The processor 3 can obtain the distances of the plurality of sample pixel regions and the plurality of sample Z-axis coordinates by processing the plurality of the preferred pictures which are obtained at the preferred imaging position and the plurality of peripheral positions by the sample camera.

In step S11, the functional relationship between the distance of the plurality of pixel regions and the Z-axis coordinate is generated according to the distances of the plurality of sample pixel regions and the plurality of sample Z-axis coordinates.

The processor 3 can generate the functional relationship, of the camera having the same model as the sample camera, between the distance of the plurality of pixel regions and the Z-axis coordinate by analyzing the distances of the plurality of sample pixel regions and the plurality of sample Z-axis coordinates. It is further found through experiments that the distance of the pixel regions has a stable linear relationship with the Z-axis coordinate.

Although the principles and implementations of the present disclosure are described by using specific examples in this specification, the descriptions of the foregoing embodiments are merely intended to help understand the method and the core idea of the method of the present disclosure. In addition, those skilled in the art can make modifications to the specific implementations and application range according to the idea of the present disclosure. In conclusion, the content of this specification is not construed as a limitation to the present disclosure.

What is claimed is:
1. A camera calibration method, for calibrating a camera, the camera comprising a lens and a photosensitive chip, wherein the camera calibration method comprises:
obtaining distances of a plurality of sample pixel regions of a plurality of preferred pictures, which are obtained at a preferred imaging position range by a sample camera, and a plurality of sample Z-axis coordinates, wherein the sample camera and the camera to be calibrated have the same model, and definition of each of the preferred pictures corresponding to the preferred imaging position is higher than definition of a picture captured by the sample camera at one other position; and generating a functional relationship between a distance of a plurality of pixel regions and a Z-axis coordinate according to the distances of the plurality of sample pixel regions and the plurality of sample Z-axis coordinates, wherein each of the pixel regions comprises a plurality of pixels, and the Z-axis coordinate is a Z-axis coordinate of the lens relative to the photosensitive chip;

obtaining a distance of a plurality of real-time pixel regions of an initial picture which is obtained at an initial position by the camera to be calibrated;

generating a predicted Z-axis coordinate according to the distance of the plurality of real-time pixel regions and the functional relationship; and controlling one of the lens and the photosensitive chip to move relative to the other of the lens and the photosensitive chip from the initial position to the predicted Z-axis coordinate.

2. The camera calibration method of claim 1, wherein the step of obtaining the distances of the plurality of sample pixel regions of the plurality of preferred pictures, which are obtained at the preferred imaging position range by the sample camera, and the plurality of sample Z-axis coordinates comprises:

controlling the sample camera to move to a preferred imaging position and a plurality of peripheral positions adjacent to the preferred imaging position, wherein the preferred imaging position range comprises the preferred imaging position and the plurality of peripheral positions; and obtaining the distances of the plurality of sample pixel regions of the plurality of preferred pictures, which are obtained at the preferred imaging position and the plurality of peripheral positions by the sample camera, and the plurality of sample Z-axis coordinates.

3. The camera calibration method of claim 2, wherein the step of controlling the sample camera to move to the preferred imaging position and the plurality of peripheral positions adjacent to the preferred imaging position comprises:

controlling the sample camera to move to the preferred imaging position; and controlling the sample camera to move, from the preferred imaging position served as a starting point and along a positive direction and a negative direction of the Z-axis, to the plurality of peripheral positions adjacent to the preferred imaging position.

4. The camera calibration method of claim 1, wherein after the step of controlling the one of the lens and the photosensitive chip to move relative to the other of the lens and the photosensitive chip from the initial position to the predicted Z-axis coordinate, the camera calibration method further comprises:

controlling the one of the lens and the photosensitive chip to move, through at least one movement operation, relative to the other of the lens and the photosensitive chip to a final Z-axis coordinate.

5. The camera calibration method of claim 4, wherein definition of the picture obtained at the final Z-axis coordinate by the camera is higher than definition of the picture obtained at the predicted Z-axis by the camera.

6. The camera calibration method of claim 4, wherein a Z-axis movement distance corresponding to each of the at least one movement operation is smaller than a Z-axis movement distance from the initial position to the predicted Z-axis coordinate.

7. The camera calibration method of claim 1, wherein a number of the plurality of real-time pixel regions of the initial picture is not less than 5, and a number of the sample pixel regions of each of the preferred pictures is not less than 5.

8. The camera calibration method of claim 1, wherein the functional relationship is a linear functional relationship.

9. A camera calibration device, for calibrating a camera, wherein the camera calibration device comprises:

a first clamping module used for clamping a lens;

a second clamping module used for clamping a photosensitive chip;

a memory used for storing a plurality of program instructions; and a processor electrically connected to the memory, the photosensitive chip, and one of the first clamping module and the second clamping module, wherein the processor is used for executing the plurality of program instructions to implement operations comprising:

obtaining distances of a plurality of sample pixel regions of a plurality of preferred pictures, which are obtained at a preferred imaging position range by a sample camera, and a plurality of sample Z-axis coordinates, wherein the sample camera and the camera to be calibrated have the same model, and definition of each of the preferred pictures corresponding to the preferred imaging position is higher than definition of a picture captured by the sample camera at one other position; and generating a functional relationship between a distance of a plurality of pixel regions and a Z-axis coordinate according to the distances of the plurality of sample pixel regions and the plurality of sample Z-axis coordinates, wherein each of the pixel regions comprises a plurality of pixels, and the Z-axis coordinate is a Z-axis coordinate of the lens relative to the photosensitive chip;

obtaining a distance of a plurality of real-time pixel regions of an initial picture which is obtained at an initial position by the camera to be calibrated;

generating a predicted Z-axis coordinate according to the distance of the plurality of real-time pixel regions and the functional relationship; and controlling one of the lens and the photosensitive chip to move relative to the other of the lens and the photosensitive chip from the initial position to the predicted Z-axis coordinate.

10. The camera calibration device of claim 9, wherein the first clamping module comprises a three-axis or six-axis clamp, and the second clamping module comprises a three-axis or six-axis clamp.

11. The camera calibration device of claim 9, wherein the second clamping module is used for clamping a circuit board electrically connected to the photosensitive chip, and the circuit board is used for lighting the photosensitive chip.

12. The camera calibration device of claim 11, wherein the memory is disposed on the circuit board.

13. The camera calibration device of claim 9, wherein the memory comprises a non-permanent memory, a random access memory, and/or a non-volatile memory in a computer-readable medium.

14. The camera calibration device of claim 13, wherein the memory comprises a read-only memory or a flash memory.

15. The camera calibration device of claim 11, wherein the processor is disposed on the circuit board.

16. The camera calibration device of claim 9, wherein the processor comprises a micro controller unit, an integrated chip, or a control circuit.

\* \* \* \* \*